US007715599B2

(12) United States Patent
Hiraizumi et al.

(10) Patent No.: US 7,715,599 B2
(45) Date of Patent: May 11, 2010

(54) IMAGE PROCESSING APPARATUS AND METHOD, AND PROGRAM

(75) Inventors: Kei Hiraizumi, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 11/559,691

(22) Filed: Nov. 14, 2006

(65) Prior Publication Data

US 2007/0127786 A1    Jun. 7, 2007

(30) Foreign Application Priority Data

Dec. 5, 2005    (JP)    ............................. 2005-350822

(51) Int. Cl.
*G06K 9/00*    (2006.01)
(52) U.S. Cl. ........................ 382/118; 382/181; 382/115; 340/5.52; 340/5.53; 340/5.8; 340/5.86
(58) Field of Classification Search ................. 382/181, 382/115, 118; 340/5.52–5.53, 5.8–5.86
See application file for complete search history.

(56) References Cited

U.S. PATENT DOCUMENTS 5,161,204 A * 11/1992 Hutcheson et al. .......... 382/157

2009/0175496 A1 *    7/2009 Kondo et al. ................ 382/103

FOREIGN PATENT DOCUMENTS

JP            9-134428        5/1997
JP          2003-199729       7/2003

* cited by examiner

*Primary Examiner*—Samir A. Ahmed
*Assistant Examiner*—Ruiping Li
(74) *Attorney, Agent, or Firm*—Oblon, Spivak, McClelland, Maier & Neustadt, L.L.P.

(57) ABSTRACT

An image processing apparatus includes a first extraction section extracting first feature quantities from image data of an image of a subject captured in a first period; a first estimation section estimating a first average value of the first feature quantities on the basis of second feature quantities extracted from image data of an image of a registered subject captured in a second period and third feature quantities extracted from image data of an image of the registered subject captured in a third period; a second estimation section estimating a first distribution width indicating the width of dispersion of the first feature quantities with respect to the first average value on the basis of the second and third feature quantities; and a determination section determining whether or not the first feature quantities are within a predetermined range based on the first average value and the first distribution width.

9 Claims, 15 Drawing Sheets

FACE IMAGE CAPTUERED FOR AUTHENTICATION
CAPTURED FACE IMAGE

PREVIOUSLY CAPTURED FACE IMAGES

RANGE OF FEATURE QUANTITIES (MULTIDIMENSIONAL SPACE)

A31

A32

A33

IMAGE PROCESSING APPARATUS AND METHOD, AND PROGRAM

CROSS REFERENCES TO RELATED APPLICATIONS

The present invention contains subject matter related to Japanese Patent Application JP 2005-350822 filed in the Japanese Patent Office on Dec. 5, 2005, the entire contents of which are incorporated herein by reference.

BACKGROUND OF THE INVENTION

1. Field of the Invention

The present invention relates to image processing apparatuses and methods, and programs, and more particularly, to an image processing apparatus and method, and a program, which are suitably used for personal authentication.

2. Description of the Related Art

Face image authentication in which personal authentication is performed using an image of the face of a person (hereinafter, also referred to as a face image) is known.

In known face image authentication, as shown in FIG. 1, a plurality of face images 11-1 to 11-3 of a person (a registered person) that have been previously captured and recorded in advance are compared with a face image 12 of a person to be identified that is newly captured for face image authentication, and it is determined whether or not the person to be identified is equal to the registered person.

Face image data of the previously captured face images 11-1 to 11-3 and face image data of the newly captured face image 12 are subjected to predetermined conversion processing, and the feature quantities of features of the faces of the persons are extracted from the individual sets of image data. Then, it is determined whether or not the feature quantity extracted from the face image data of the face image 12 is located within an area (hereinafter, referred to as an authentication area), which is constituted by the feature quantities extracted from the face image data of the face images 11-1 to 11-3, in a feature space.

If it is determined that the feature quantity extracted from the face image data of the face image 12 is located within the authentication area, the person to which the newly captured face image 12 belongs is authenticated as the registered person. In contrast, if it is determined that the feature quantity extracted from the face image data of the face image 12 is not located within the authentication area, the person to which the newly captured face image 12 belongs is identified as not being the registered person, and the subsequent processing is thus not carried out.

In addition, for face image authentication, since a plurality of previously captured face images are recorded in advance, the average of the feature quantities of the plurality of face images can be acquired, the average of the face images of a registered person can be estimated, and the width of dispersion of feature quantities can be estimated for each face image. Thus, the accuracy of face image authentication can be further improved.

In addition, an authentication apparatus is available in which statistical data representing general time-lapse changes in regions of faces and image data of a previously captured face image of a registered person are stored in advance and in which authentication is performed by transforming each region of the stored face image of the registered person on the basis of the statistical data (see, for example, Japanese Unexamined Patent Application Publication No. 09-134428). In this authentication apparatus, authentication is performed by comparing the previously captured face image of the registered person that has been transformed on the basis of the statistical data with a face image of a person to be identified newly captured for authentication.

SUMMARY OF THE INVENTION

However, in the above-mentioned technologies, time-lapse changes in the face of a registered person, such as a change in the hairstyle and age-related changes in the face, are not taken into consideration. Thus, it is difficult to estimate how the face of the registered person changes with the lapse of time.

The position of the authentication area in the feature space does not change with the lapse of time. Thus, it is difficult to prevent spoofing by a malicious third party who uses a previously captured photograph of the face of a registered person. In addition, due to a change in the hairstyle or age-related changes in the face, a person to be identified may not be correctly authenticated as the registered person.

In addition, in the method for transforming a previously captured face image of a registered person on the basis of statistical data, although a time-lapse change in the face of the registered person can be coped with to some extent, a large amount of time is spent for authentication, which involves a large amount of processing. Thus, it is difficult to realize this method.

It is desirable to perform more reliable face image authentication more easily.

An image processing apparatus according to an embodiment of the present invention includes first extracting means for extracting first feature quantities from image data of an image of a subject captured in a first period; first estimating means for estimating a first average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period; second estimating means for estimating a first distribution width indicating the width of dispersion of the first feature quantities with respect to the first average value on the basis of the second feature quantities and the third feature quantities; and determining means for determining whether or not the first feature quantities are within a predetermined range based on the first average value and the first distribution width.

The first estimating means may estimate the first average value on the basis of a second average value of the second feature quantities and a third average value of the third feature quantities, and the second estimating means may estimate the first distribution width on the basis of a second distribution width indicating the width of dispersion of the second feature quantities with respect to the second average value and a third distribution width indicating the width of dispersion of the third feature quantities with respect to the third average value.

The second estimating means may define a larger one of the second distribution width and the third distribution width as the first distribution width.

The second estimating means may define, as the first distribution width, a value calculated by using an equation:

$$d3 = \sqrt{\frac{1}{n1+n2}\sum_{i=1,2}\sum_{x\in xi}(x\cdot y - mi)^2},$$

where d3 represents the first distribution width, x·y represents each of the second feature quantities and the third feature quantities, m1 represents the second average value, m2 represents the third average value, n1 represents the number of the second feature quantities, and n2 represents the number of the third feature quantities.

The image processing apparatus may further include second extracting means for extracting the second feature quantities from the image data of the image of the registered subject captured in the second period and for extracting the third feature quantities from the image data of the image of the registered subject captured in the third period.

The image processing apparatus may further include calculating means for calculating a discriminant axis for separating distribution of the feature quantities and distribution of the third feature quantities in a feature space. The first extracting means may define an inner product of a feature quantity extracted from the image data of the image captured in the first period and the discriminant axis as one of the first feature quantities. The second extracting means may define an inner product of a feature quantity extracted from the image data of the image captured in the second period and the discriminant axis as one of the second feature quantities, and may define an inner product of a feature quantity extracted from the image data of the image captured in the third period and the discriminant axis as one of the third feature quantities.

An image processing method or program according to an embodiment of the present invention includes the steps of extracting first feature quantities from image data of an image of a subject captured in a first period; estimating an average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period; estimating a distribution width indicating the width of dispersion of the first feature quantities with respect to the average value on the basis of the second feature quantities and the third feature quantities; and determining whether or not the first feature quantities are within a predetermined range based on the average value and the distribution width.

According to an embodiment of the present invention, first feature quantities are extracted from image data of an image of a subject captured in a first period; a first average value of the first feature quantities is estimated on the basis of second feature quantities extracted from image data of an image of a registered subject captured in a second period, which is before the first period, and third feature quantities extracted from image data of an image of the registered subject captured in a third period, which is before the first period and which is different from the second period; a first distribution width indicating the width of dispersion of the first feature quantities with respect to the first average value is estimated on the basis of the second feature quantities and the third feature quantities; and determination of whether or not the first feature quantities are within a predetermined range based on the first average value and the first distribution width is performed.

According to an embodiment of the present invention, face image authentication can be performed. In particular, according to an embodiment of the present invention, more reliable face image authentication can be achieved more easily.

DESCRIPTION OF THE PREFERRED EMBODIMENTS

Figure 1:
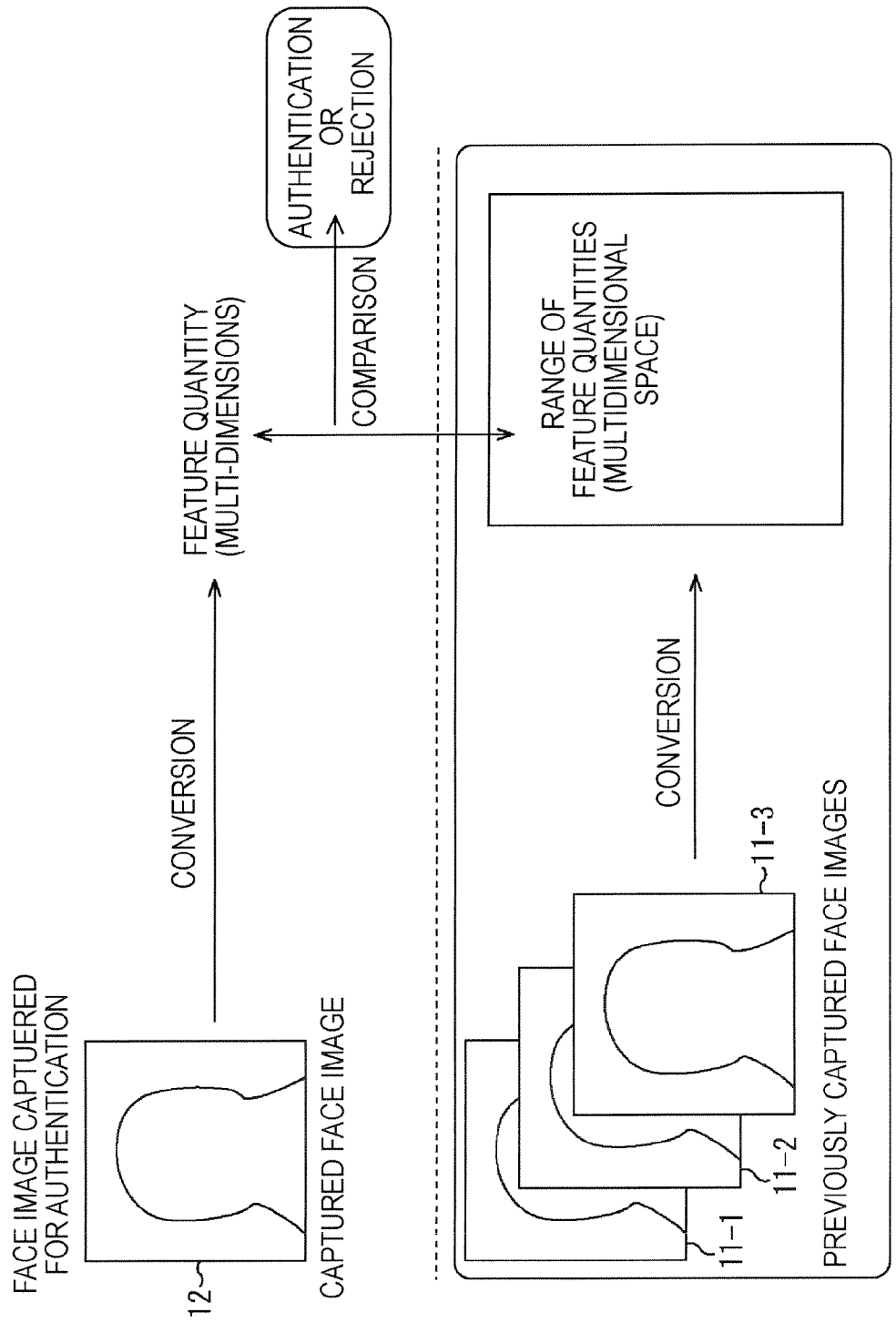
FIG. 1 is an illustration for explaining face image recognition of the related art.

Before describing preferred embodiments of the present invention, the correspondence between the features of the present invention and embodiments described in the specification or the drawings will be discussed below. This description is intended to assure that embodiments supporting the present invention are described in the specification or the drawings. Thus, even if an embodiment described in the specification or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

An image processing apparatus according to an embodiment of the present invention includes first extracting means (for example, an extraction section 82 in FIG. 2 and a converter 217 in FIG. 9) for extracting first feature quantities from image data of an image of a subject captured in a first period (for example, a period T3 in FIG. 3); first estimating means (for example, a distribution center estimator 214 in FIG. 9) for estimating a first average value of the first feature quantities on the basis of second feature quantities extracted from image data of an image of a registered subject captured in a second period (for example, a period T1 in FIG. 3), which is before the first period, and third feature quantities extracted from image data of an image of the registered subject captured in a third period (for example, a period T2 in FIG. 3), which is before the first period and which is different from the second period; second estimating means (for example, a distribution range estimator 216 in FIG. 9) for estimating a first distribution width indicating the width of dispersion of the first feature quantities with respect to the first average value on the basis of the second feature quantities and the third feature quantities; and determining means (for example, a determination unit 218 in FIG. 9) for determining whether or not the first feature quantities are within a predetermined range based on the first average value and the first distribution width.

Figure 14:
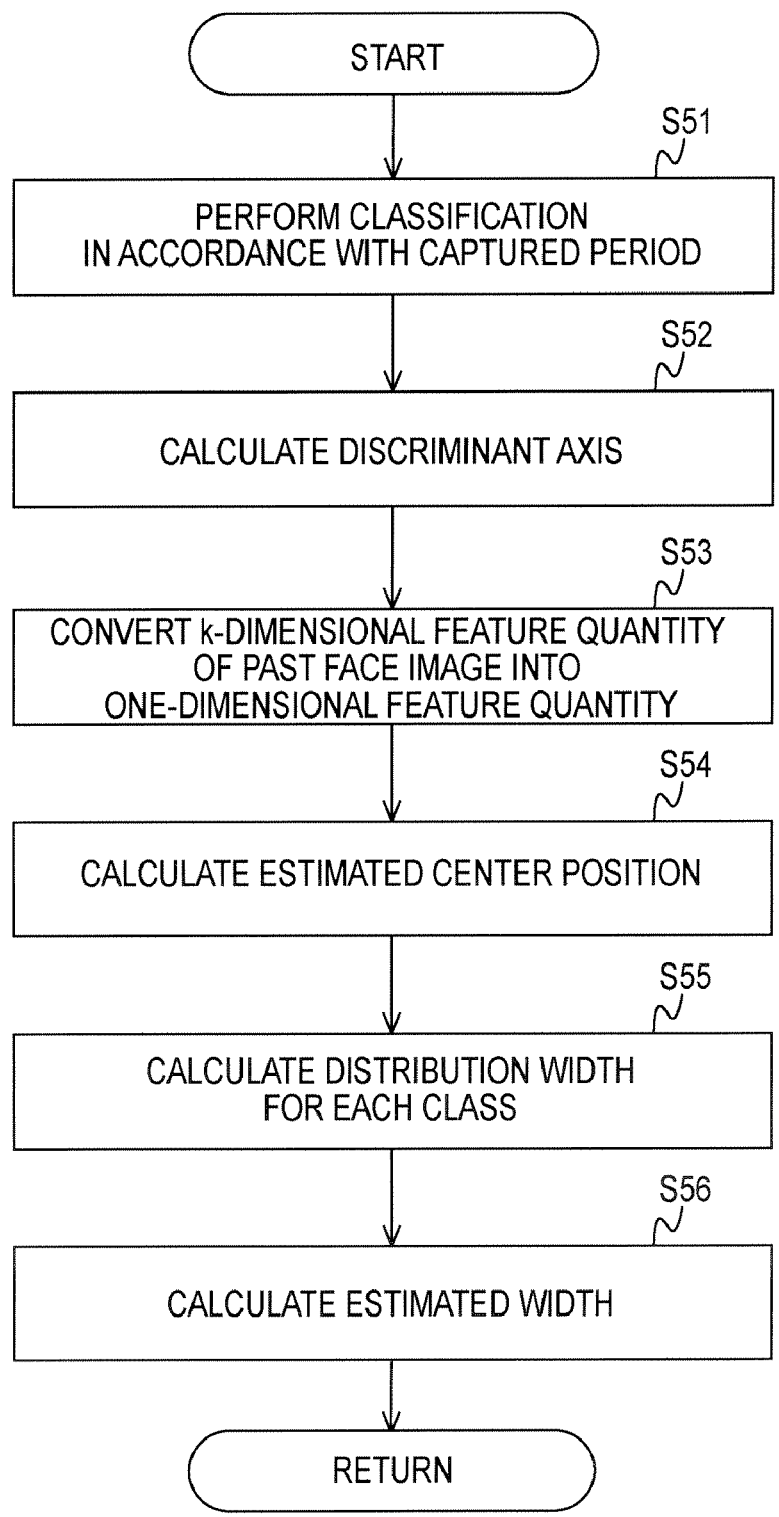
FIG. 14 is a flowchart of a process for estimating a distribution range.

The first estimating means (for example, the distribution center estimator 214 which performs processing of step S54 in FIG. 14) may estimate the first average value on the basis of a second average value of the second feature quantities and a third average value of the third feature quantities, and the second estimating means (for example, the distribution range estimator 216 which performs processing of step S56 in FIG. 14) may estimate the first distribution width on the basis of a second distribution width indicating the width of dispersion of the second feature quantities with respect to the second average value and a third distribution width indicating the width of dispersion of the third feature quantities with respect to the third average value.

The image processing apparatus may further include second extracting means (for example, an extraction section 84 in FIG. 2 and a converter 213 in FIG. 9) for extracting the second feature quantities from the image data of the image of the registered subject captured in the second period and for extracting the third feature quantities from the image data of the image of the registered subject captured in the third period.

The image processing apparatus may further include calculating means (for example, a determination/analysis unit 212 in FIG. 9) for calculating a discriminant axis for separating distribution of the feature quantities and distribution of the third feature quantities in a feature space. The first extracting means (for example, the converter 217 which performs processing of step S15 in FIG. 10) may define an inner product of a feature quantity extracted from the image data of the image captured in the first period and the discriminant axis as one of the first feature quantities. The second extracting means (for example, the converter 213 which performs processing of step S53 in FIG. 14) may define an inner product of a feature quantity extracted from the image data of the image captured in the second period and the discriminant axis as one of the second feature quantities, and may define an inner product of a feature quantity extracted from the image data of the image captured in the third period and the discriminant axis as one of the third feature quantities.

Figure 10:
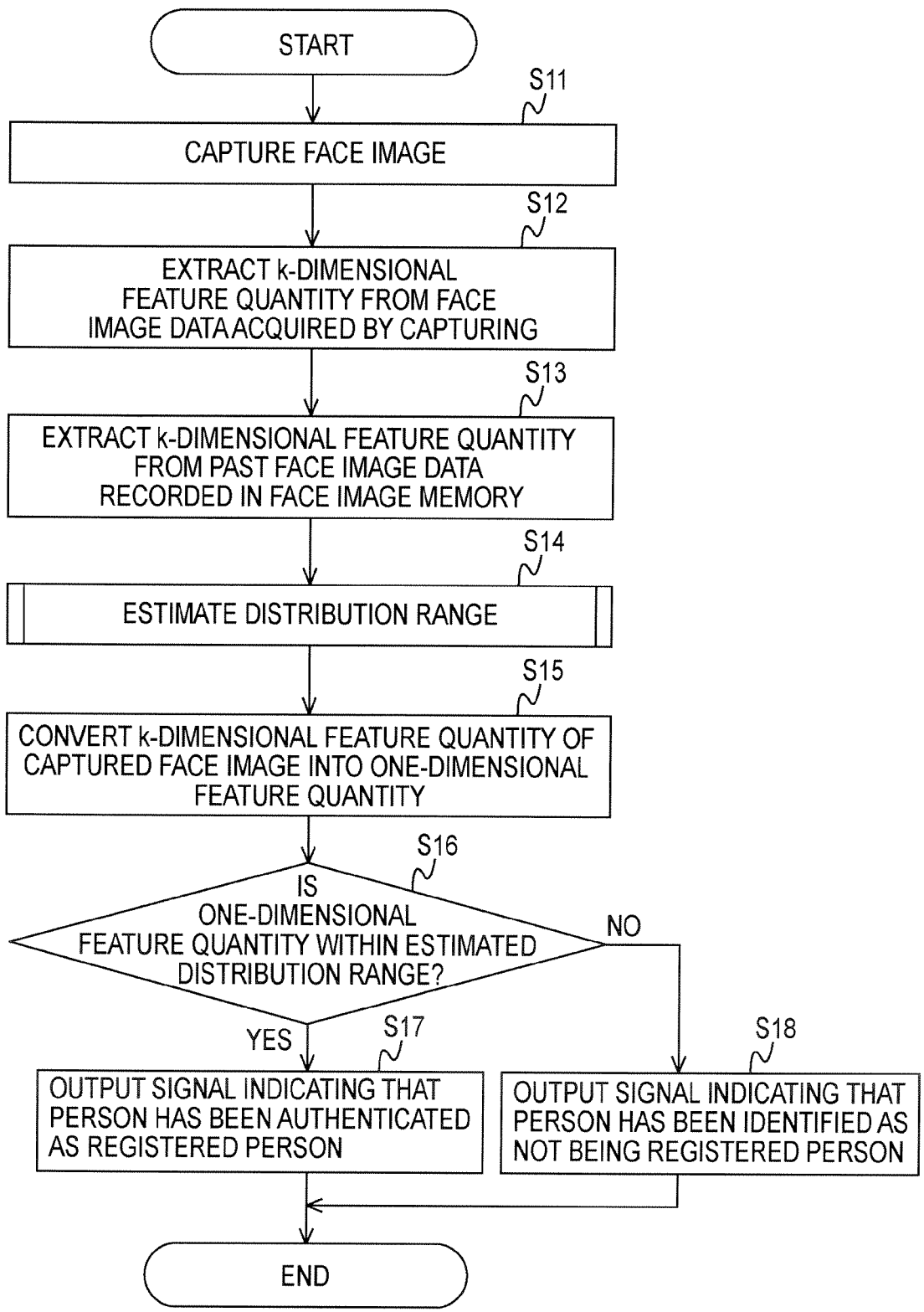
FIG. 10 is a flowchart of an authentication process.

An image processing method or program according to an embodiment of the present invention includes the steps of extracting first feature quantities from image data of an image of a subject captured in a first period (for example, steps S12 and S15 in FIG. 10); estimating an average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period (for example, step S54 in FIG. 14); estimating a distribution width indicating the width of dispersion of the first feature quantities with respect to the average value on the basis of the second feature quantities and the third feature quantities (for example, step S56 in FIG. 14); and determining whether or not the first feature quantities are within a predetermined range based on the average value and the distribution width (for example, step S16 in FIG. 10).

Embodiments of the present invention will be described with reference to the drawings.

Figure 2:
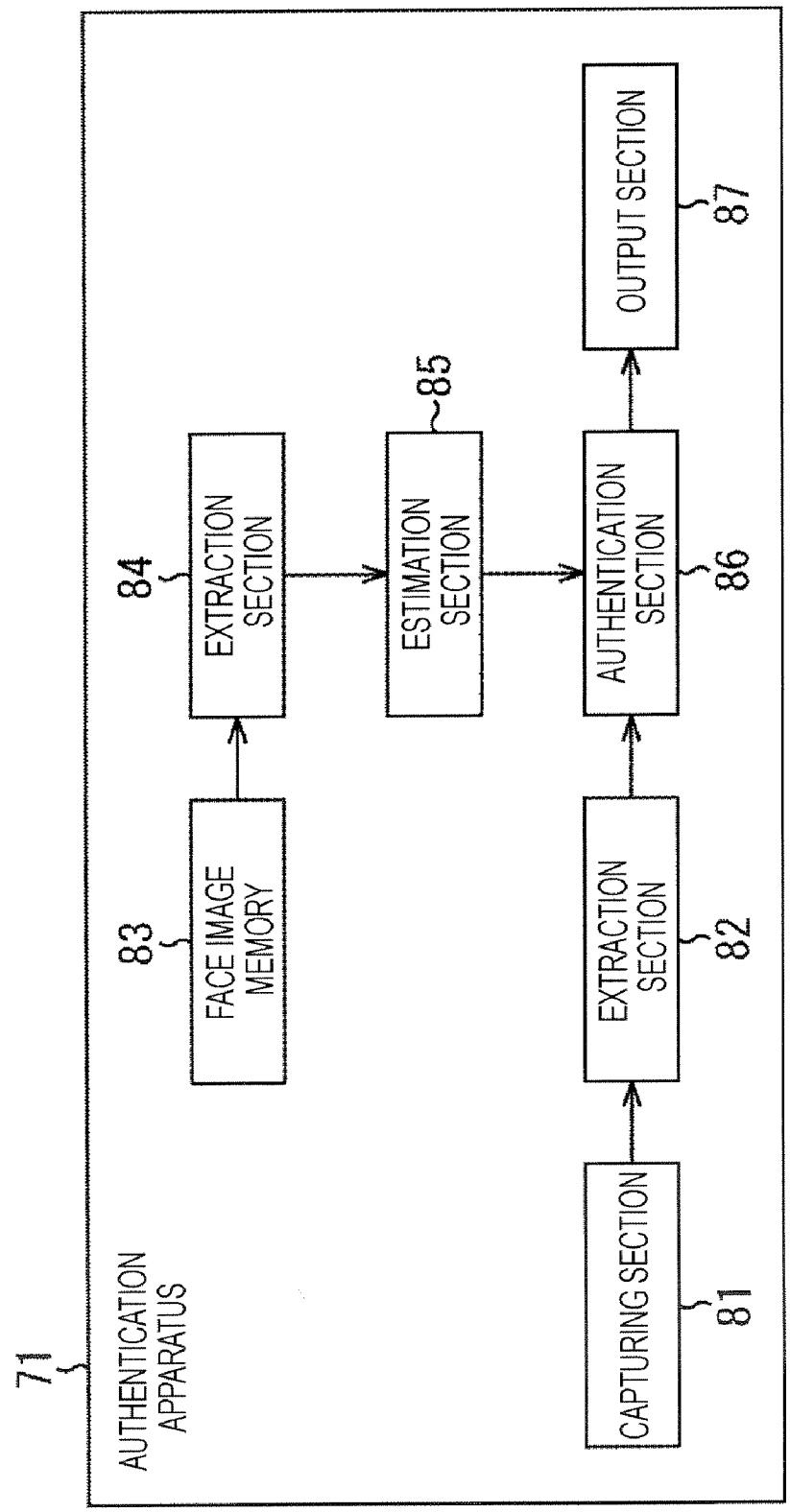
FIG. 2 is a block diagram showing an example of the configuration of an authentication apparatus.

FIG. 2 is a block diagram showing an example of the configuration of an authentication apparatus 71 according to an embodiment of the present invention.

The authentication apparatus 71 captures a human face as a subject, and performs face image authentication in which it is determined whether or not the person to be identified, who serves as the captured subject, is equal to a predetermined person (a registered person).

The authentication apparatus 71 includes a capturing section 81, an extraction section 82, a face image memory 83, an extraction section 84, an estimation section 85, an authentication section 86, and an output section 87.

The capturing section 81 includes, for example, a camera. The capturing section 81 captures an image of the face of a user (a person to be identified) (hereinafter, also referred to as a face image). The capturing section 81 supplies captured face image data to the extraction section 82.

The extraction section 82 extracts the feature quantity of a feature of the face image based on the face image data supplied from the capturing section 81, and supplies the extracted feature quantity to the authentication section 86.

The face image memory 83 includes, for example, a non-volatile memory, such as a semiconductor memory. The face image memory 83 records face image data of previously captured face images of a registered person. The face image memory 83 supplies the recorded face image data to the extraction section 84.

The extraction section 84 extracts the feature quantities of features of the face image based on the face image data supplied from the face image memory 83, and supplies the extracted feature quantities to the estimation section 85.

The estimation section 85 calculates, in accordance with the feature quantities supplied from the extraction section 84, the center position of a predetermined area, which is estimated to include a feature quantity of the face image of the person to be identified newly captured by the capturing section 81, in a feature space (hereinafter, referred to as an estimated center position). The estimation section 85 also calculates, in accordance with the feature quantities supplied from the extraction section 84, the distance from the edge of the predetermined area to the estimated center position (hereinafter, referred to as an estimated width). The estimation section 85 supplies to the authentication section 86 the acquired estimated center position and the acquired estimated width.

The authentication section 86 determines whether or not the feature quantity supplied from the extraction section 82 is located within the predetermined area, which is defined on the basis of the estimated center position and the estimated width supplied from the estimation section 85, in the feature space. The authentication section 86 supplies to the output section 87 a signal indicating a result of determination.

The output section 87 outputs, in accordance with the signal indicating the result of determination supplied from the authentication section 86, to an apparatus (not shown), such as a computer, connected to the authentication apparatus 71 a signal indicating that the person has been authenticated as the registered person or a signal indicating that the person has been identified as not being the registered person.

Face image data of face images of the registered person that have been previously captured is recorded in advance in the authentication apparatus 71. For example, as shown in FIG. 3, face image data of face images captured during the past periods T1 and T2, from among three consecutive periods, that is, periods T1, T2, and T3, is recorded in the authentication apparatus 71.

Figure 3:
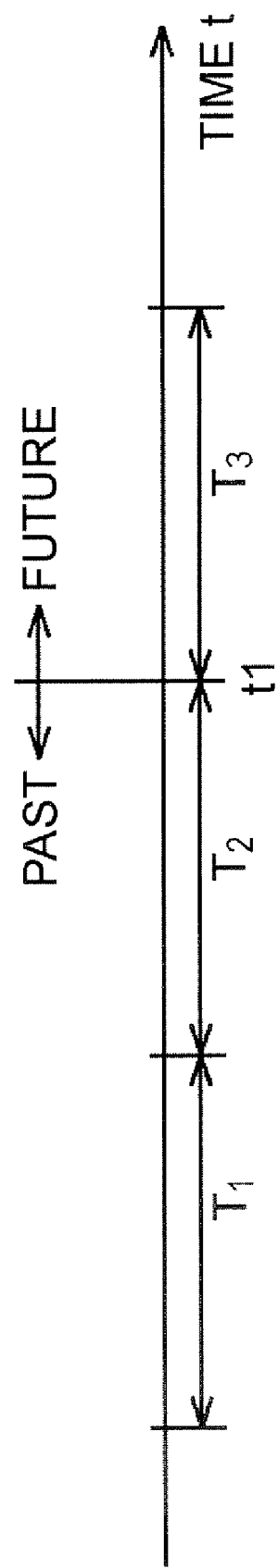
FIG. 3 is an illustration for explaining periods in which face images are captured.

In FIG. 3, the horizontal axis represents time. Time t1 represents the present time. Thus, when viewed from the present time t1, the periods T1 and T2 are past periods, and the period T3 (here, the time t1 is included in the period T3) is a future period.

In FIG. 3, the periods T1 to T3 have the same length. The periods T1, T2, and T3 represent, for example, the day before yesterday, yesterday, and today, respectively. Alternatively, the periods T1, T2, and T3 represent, for example, the week before last, the last week, and this week, respectively. Alternatively, the periods T1, T2, and T3 represent, for example, the year before last, the last year, and this year, respectively.

The authentication apparatus 71 performs, on the basis of recorded face image data of face images captured in the periods T1 and T2, authentication of a person to which a face image captured at the time t1 belongs.

Figure 4A:
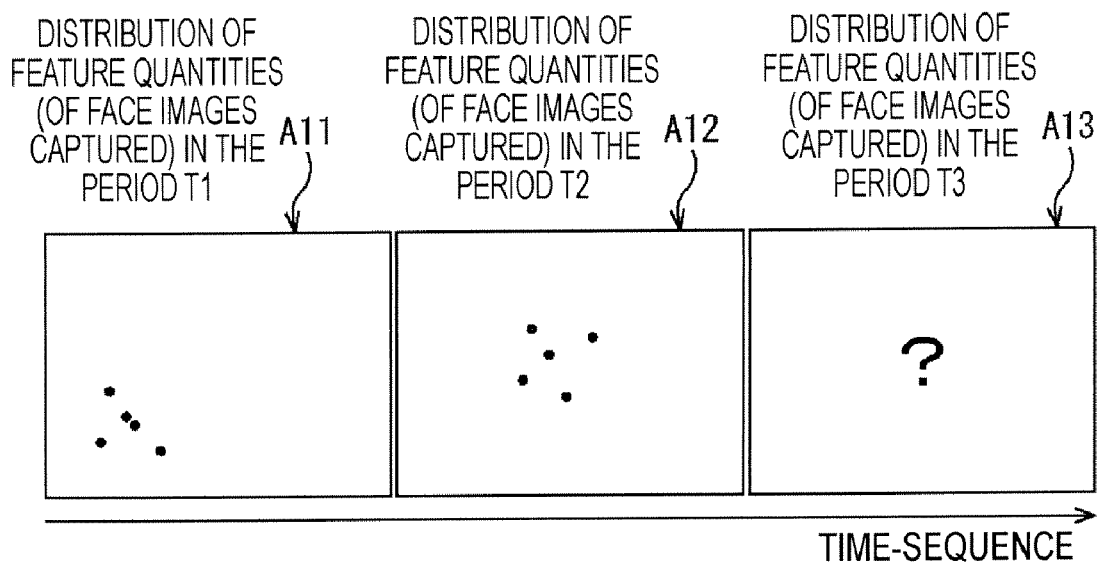
FIGS. 4A to 4C illustrate distribution of the feature quantities of face images.

In general, when authentication of a person is performed on the basis of face image data of past face images, for example, as shown in FIG. 4A, an estimated range in which the feature quantities of face images to be captured in the period T3 will be distributed is calculated, as shown by an arrow A13, in accordance with distribution of feature quantities of face images captured in the period T1 shown by an arrow A11 and distribution of feature quantities of face images captured in the period T2 shown by an arrow A12.

In FIG. 4A, the horizontal axis represents time. A point in each of the feature spaces shown by the arrows A11 and A12 represents a feature quantity extracted from a piece of face image data.

Figure 4B:
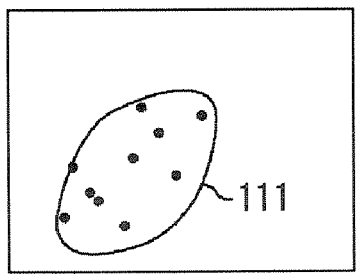

In the related art, a face image captured in the period T1 is not particularly distinguished from a face image captured in the period T2. As shown in FIG. 4B, in the related art, an estimated range (area) 111 in which the feature quantities of face images to be captured in the period T3 will be distributed is defined on the basis of the center position of feature quantities captured in the periods T1 and T2.

That is, in the related art, when a feature quantity of a face image captured at the time t1 (see FIG. 3) is located within the area 111 including the feature quantities of face images captured in the periods T1 and T2 in the feature space, the person to which the captured face image belongs is authenticated as the registered person.

Human faces change as they age. Features of a face image are unique to each individual. However, some features have constant feature quantities in spite of aging, and some features have feature quantities changing with aging.

Thus, in the method for defining the area 111 on the basis of the center of the feature quantities of past face images, if a feature quantity extracted from face image data changes with the lapse of time, since the extracted feature quantity is not located within the area 111, a person may be incorrectly identified as not being the registered person even if the person is the registered person.

Figure 4C:
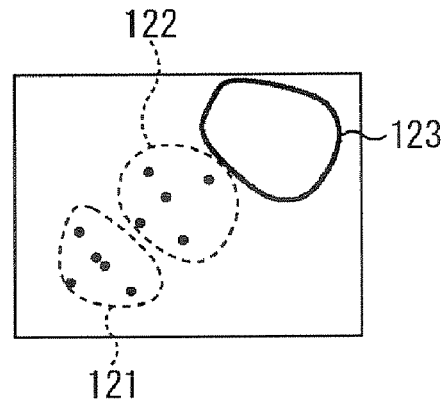

However, the authentication apparatus 71 pays attention to features whose feature quantities change with the lapse of time. As shown in FIG. 4C, the authentication apparatus 71 estimates, in accordance with a range (area) 121 in which the feature quantities of face images captured in the period T1 are distributed and a range (area) 122 in which the feature quantities of face images captured in the period T2 are distributed, a range (area) 123 in which the feature quantities of face images to be captured in the period T3 will be distributed.

Referring to FIG. 4C, the area 121 does not overlap with the area 122. As is clear from FIG. 4C, a range (area) in which the feature quantities of face images are distributed changes with the lapse of time. The authentication apparatus 71 distinguishes the feature quantities of face images captured in the period T1 (hereinafter, also referred to as feature quantities x1) from the feature quantities of face images captured in the period T2 (hereinafter, also referred to as feature quantities x2), and estimates the position and size of the area 123 on the basis of the feature quantities x1 and x2.

Figure 5A:
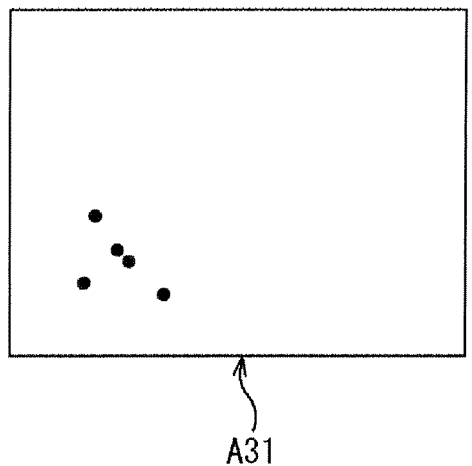
FIGS. 5A to 5C illustrate distribution of the feature quantities of face images.
Figure 5B:
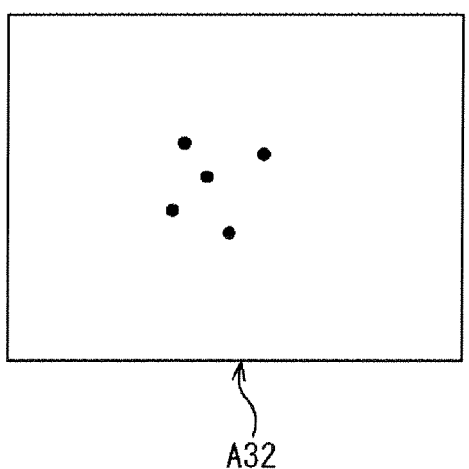
Figure 5C:
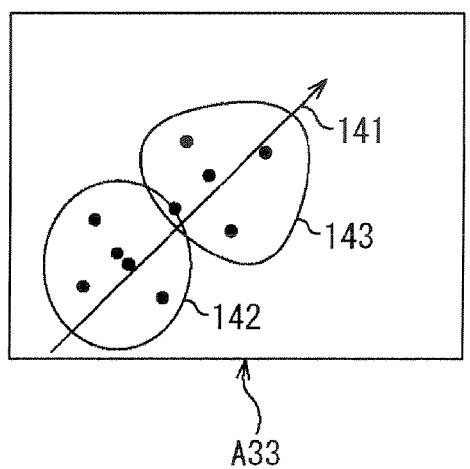

More specifically, for example, as shown in FIGS. 5A to 5C, when feature quantities are extracted from face image data of a plurality of face images captured in the periods T1 and T2, distributions of feature quantities shown by arrows A31 and A32, respectively, are acquired. Here, a point in each of the feature spaces shown by the arrows A31 and A32 represents a feature quantity extracted from a piece of face image data.

After extracting feature quantities from face image data of past face images (that is, face images captured in the periods T1 and T2), the authentication apparatus 71 calculates a discriminant axis 141 (that is, a two-dimensional vector shown in FIG. 5C) for separating the distribution of the feature quantities x1 from the distribution of the feature quantities x2 in accordance with a linear discrimination method (Fisher's method), as shown by an arrow A33.

In the feature space represented by the arrow A33, a range (area) 142 represents a range (area) in which the feature quantities x1 are distributed, and a range (area) 143 represents a range (area) in which the feature quantities x2 are distributed.

Figure 6:
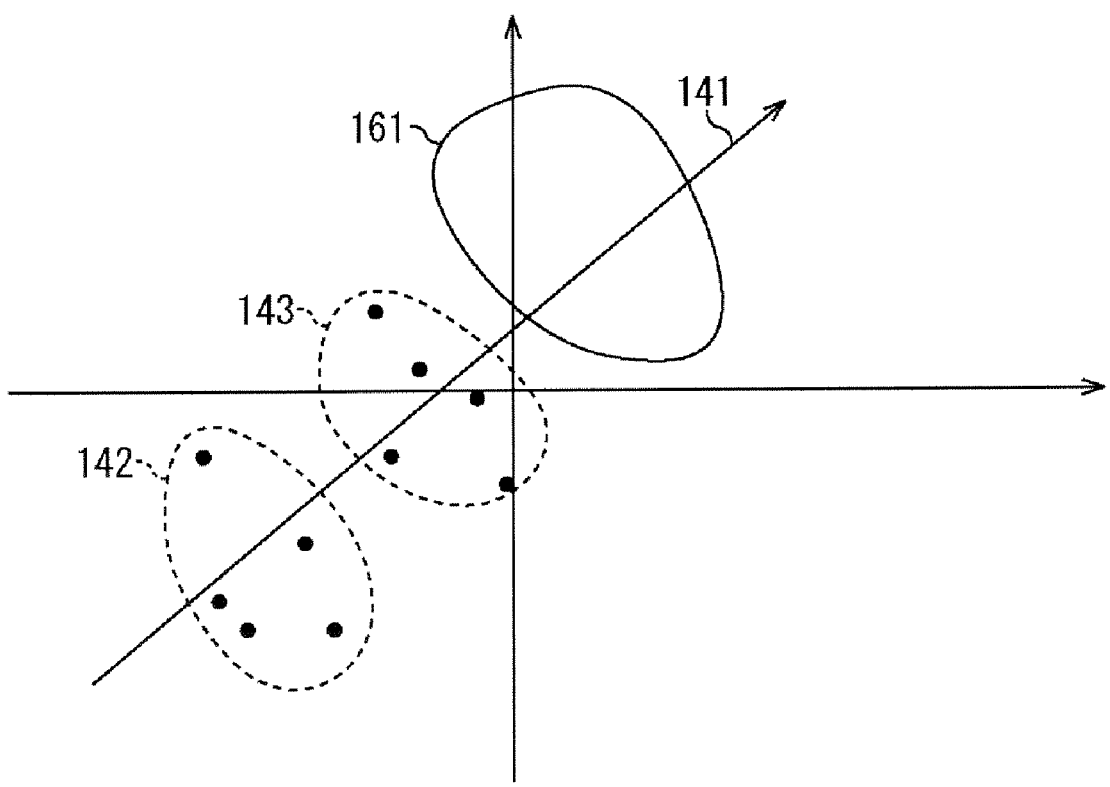
FIG. 6 is an illustration for explaining an estimated range in which the feature quantities of face images will be distributed.

After calculating the discriminant axis 141, the authentication apparatus 71 defines an estimated range (area) 161 in which the feature quantities of face images to be captured in the period T3 (hereinafter, referred to as feature quantities x3) will be distributed, as shown in FIG. 6, in accordance with an idea that the feature quantities x3 have a range (dispersion) that is substantially equal to the range of each of the feature quantities x1 and x2.

That is, the authentication apparatus 71 defines the estimated area 161 in which the feature quantities x3 will be distributed in accordance with an idea that the distance from the position of the median point (center) of the feature quantities x3 to the end of the area 161 is substantially equal to each of the distance from the position of the median point (center) of the feature quantities x1 to the end of the area 142 and the distance from the position of the median point (center) of the feature quantities x2 to the end of the area 143.

Figure 7:
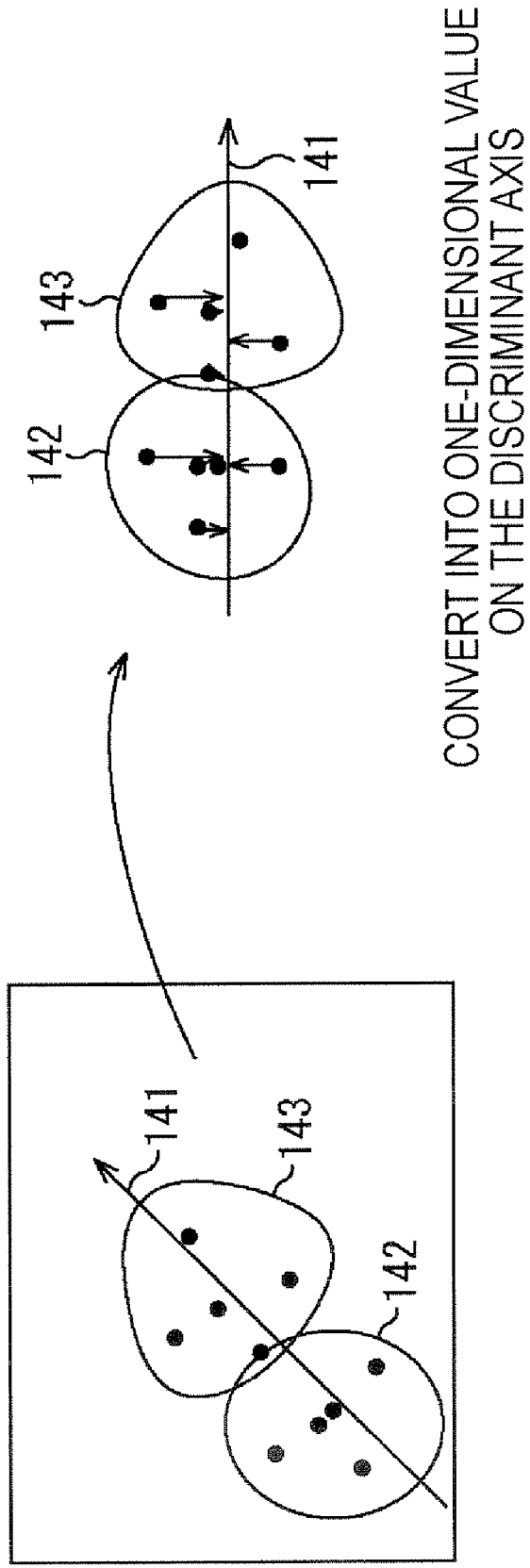
FIG. 7 is an illustration for explaining conversion from a k-dimensional feature quantity into a one-dimensional feature quantity.

When the feature quantities x1 to x3 are indicated as k-dimensional vectors ($1 \leq k$) (in FIG. 6, two-dimensional vectors), for example, the authentication apparatus 71 converts the feature quantities x1 and x2 into one-dimensional feature quantities (performs degeneration of the feature quantities) by orthogonally projecting the feature quantities x1 and x2 on the discriminant axis 141, as shown in FIG. 7. For example, the authentication apparatus 71 converts k-dimensional feature quantities into one-dimensional feature quantities by calculating the inner product of the feature quantities x1 and the discriminant axis 141 and the inner product of the feature quantities x2 and the discriminant axis 141. In FIG. 7, a point in the feature space represents a feature quantity of the feature quantities x1 or the feature quantities x2.

Figure 8:
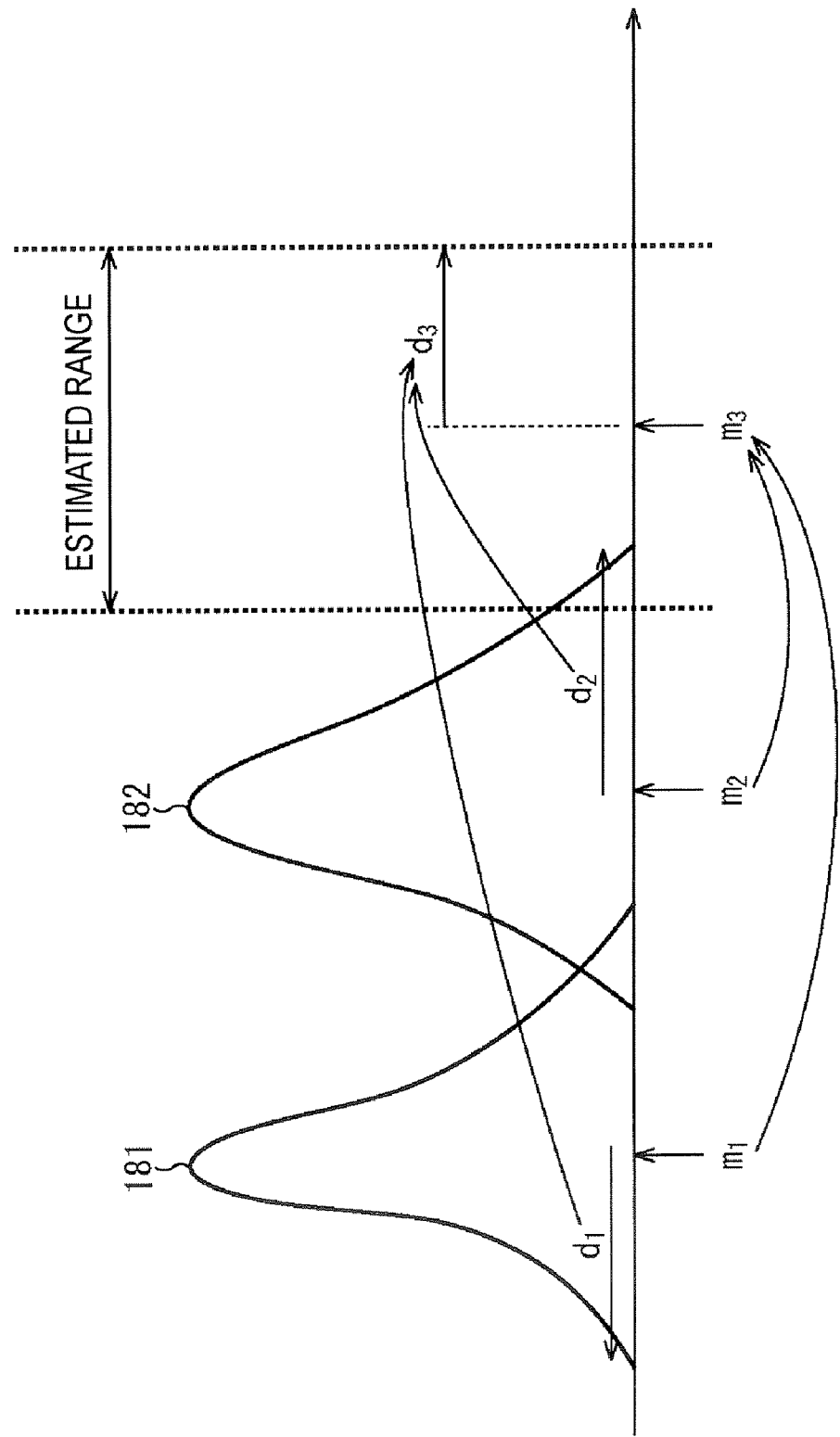
FIG. 8 illustrates an estimated range in which feature quantities of face images will be distributed.

Thus, as shown in FIG. 8, a k-dimensional feature space is converted into a one-dimensional feature space. The area 142 (see FIG. 6) is converted into a one-dimensional area (range)

having a width of d1 with respect to a position m1, and the area 143 (see FIG. 6) is converted into a one-dimensional area (range) having a width of d2 with respect to a position m2.

In FIG. 8, the horizontal axis represents feature quantities, that is, one-dimensional feature quantities calculated by the inner product of the k-dimensional feature quantities and the discriminant axis 141. In addition, the vertical axis represents the number of face images having the feature quantities. A curve 181 represents the distribution of one-dimensional feature quantities of face images captured in the period T1, and a curve 182 represents the distribution of one-dimensional feature quantities of face images captured in the period T2.

The authentication apparatus 71 estimates (predicts) a position m3 (estimated center position) at the center of distribution of one-dimensional feature quantities of face images to be captured in the period T3 in accordance with the position m1 at the center of the curve 181 and the position m2 at the center of the curve 182, and estimates the width d3 (estimated width) of deviation (dispersion) from the estimated center position m3 of the distribution of the feature quantities of the face images to be captured in the period T3 in accordance with the widths d1 and d2. The authentication apparatus 71 defines the range (area) having the width of d3 with respect to the estimated center position m3 as an estimated range in which the one-dimensional feature quantities of the face images to be captured in the period T3 will be distributed.

Thus, after capturing a face image of a person to be identified for face image authentication, the authentication apparatus 71 calculates a one-dimensional feature quantity of the face image, and determines whether or not the person to which the captured face image belongs is equal to the registered person in accordance with determination of whether or not the calculated one-dimensional feature quantity is within a range having the width d3 with respect to the position m3.

Figure 9:
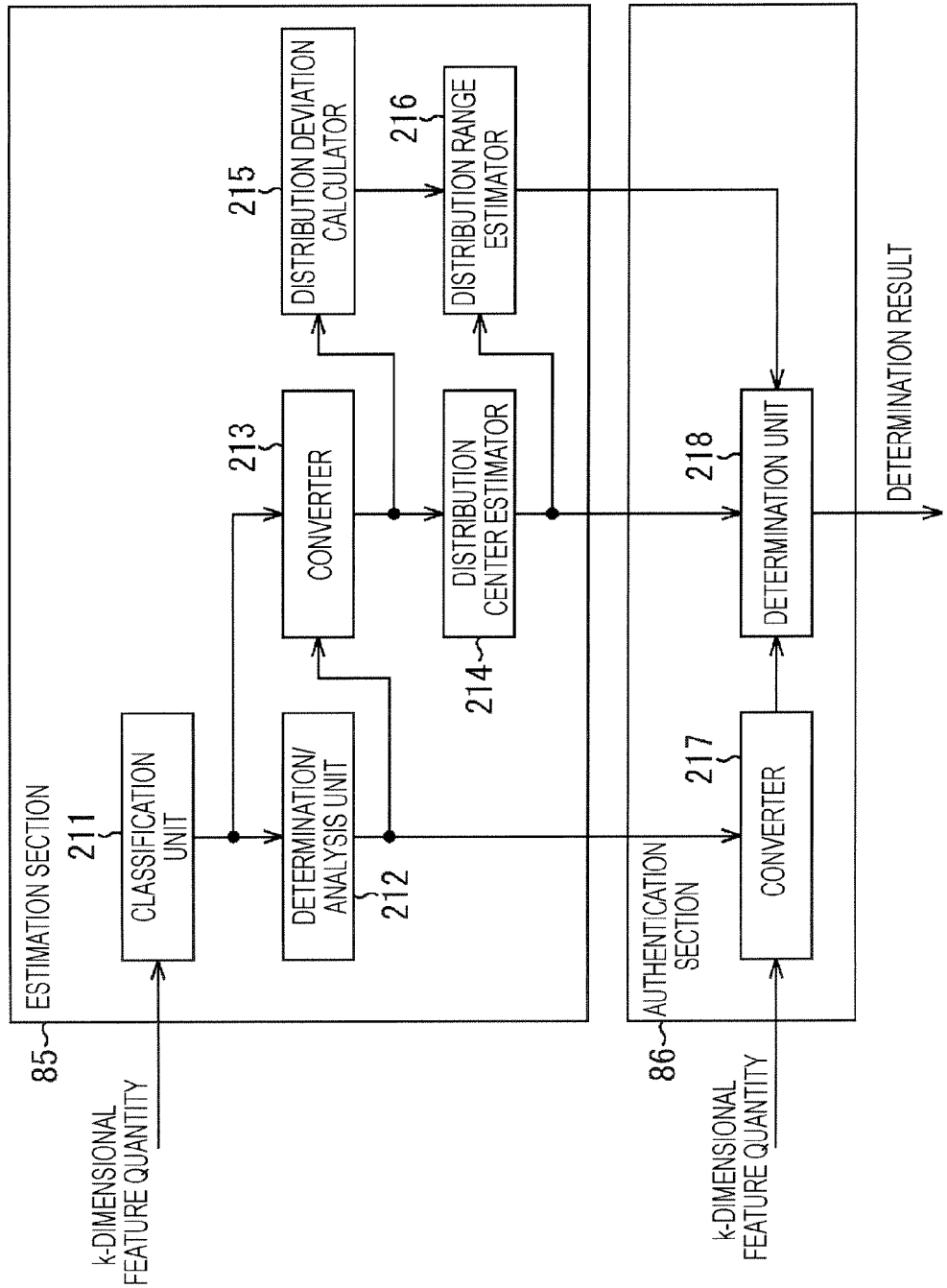
FIG. 9 is a block diagram showing an example of the detailed configuration of an estimation section and an authentication section.

FIG. 9 is a block diagram showing an example of the detailed configuration of the estimation section 85 and the authentication section 86 shown in FIG. 2.

The estimation section 85 includes a classification unit 211, a determination/analysis unit 212, a converter 213, a distribution center estimator 214, a distribution deviation calculator 215, and a distribution range estimator 216. In addition, the authentication section 86 includes a converter 217 and a determination unit 218.

The classification unit 211 classifies k-dimensional ($1 \leq k$) feature quantities supplied from the extraction section 84 (see FIG. 2) into classes in accordance with the periods in which face images were captured. For example, the classification unit 211 classifies, from among the feature quantities supplied from the extraction section 84, feature quantities of face images captured in a predetermined period into the same class.

After classifying the feature quantities into classes, the classification unit 211 generates class information indicating classes to which the feature quantities supplied from the extraction section 84 belong. Then, the classification unit 211 supplies the generated class information and the feature quantities to the determination/analysis unit 212 and the converter 213.

The determination/analysis unit 212 calculates a discriminant axis on the basis of the class information and the feature quantities supplied from the classification unit 211. The determination/analysis unit 212 supplies information on the calculated discrimination axis to the converter 213 and the converter 217 of the authentication section 86.

The converter 213 converts, using the discriminant axis supplied from the determination/analysis unit 212, the k-dimensional feature quantities supplied from the classification unit 211 into one-dimensional feature quantities. The converter 213 also supplies to the distribution center estimator 214 and the distribution deviation calculator 215 the one-dimensional feature quantities acquired by conversion and the class information supplied from the classification unit 211.

The distribution center estimator 214 calculates an estimated center position, which is the center position of distribution of the feature quantities of face images to be captured in the future (for example, in the period T3), in accordance with the feature quantities and the class information supplied from the converter 213. Then, the distribution center estimator 214 supplies information on the calculated estimated center position to the distribution range estimator 216 and the determination unit 218 of the authentication section 86.

The distribution deviation calculator 215 calculates a distribution width, which is the width of deviation (dispersion) of distribution of feature quantities belonging to each class, in accordance with the feature quantities and the class information supplied from the converter 213. Then, the distribution deviation calculator 215 supplies information on the calculated distribution width to the distribution range estimator 216.

The distribution range estimator 216 calculates an estimated width, which is the width of deviation (dispersion) of the distribution of the feature quantities of the face images to be captured in the future (for example, the period T3), in accordance with the estimated center position supplied from the distribution center estimator 214 and the distribution width supplied from the distribution deviation calculator 215. Then, the distribution range estimator 216 supplies information on the calculated estimated width to the determination unit 218 of the authentication section 86.

The converter 217 of the authentication section 86 converts, using the discriminant axis supplied from the determination/analysis unit 212, a k-dimensional feature quantity supplied form the extraction section 82 (see FIG. 2) into a one-dimensional feature quantity. The converter 217 also supplies to the determination unit 218 the one-dimensional feature quantity acquired by conversion.

The determination unit 218 determines, in accordance with the feature quantity supplied from the converter 217, the estimated center position supplied from the distribution center estimator 214, and the estimated width supplied from the distribution range estimator 216, whether or not the feature quantity of the face image captured by the capturing section 81 is within the area (range) (hereinafter, also referred to as an estimated distribution range), which is defined on the basis of the estimated center position and the estimated width, in a feature space.

An authentication process performed by the authentication apparatus 71 will now be described with reference to the flowchart of FIG. 10.

In step S11, the capturing section 81 captures a face image of a person to be identified as a subject, and supplies the acquired face image data to the extraction section 82.

In step S12, the extraction section 82 extracts a k-dimensional feature quantity from the face image data supplied from the capturing section 81, and supplies the extracted feature quantity to the converter 217.

Figure 11:
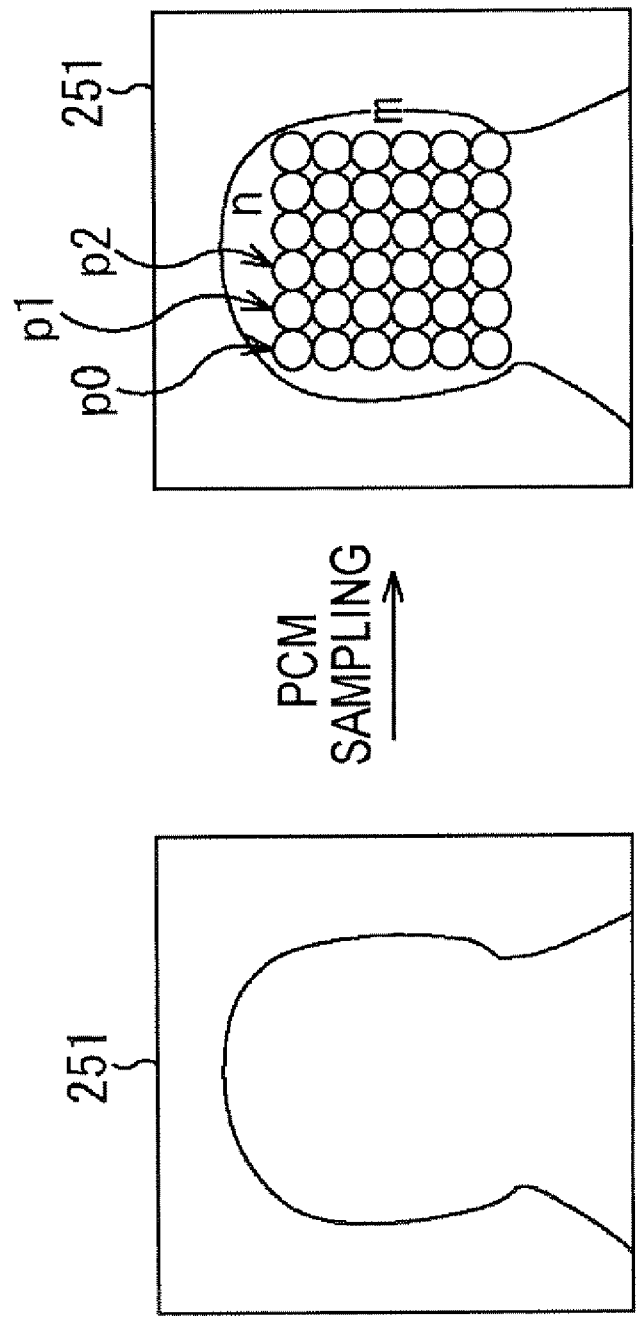
FIG. 11 is an illustration for explaining an example of a feature quantity extracted from face image data.

For example, as shown in FIG. 11, the extraction section 82 samples face image data of a face image 251 supplied from the capturing section 81 in accordance with a pulse code modulation (PCM) method, and defines a k-dimensional vector constituted by the pixel values of acquired k (n×m) pixels as a feature quantity.

In FIG. 11, a circle on the face image 251 in the right portion of FIG. 11 represents a pixel. In addition, arrows P0 to P2 represent the first to third pixels from the left in the top row of FIG. 11.

For example, as pixels of a facial portion of the person to be identified on the face image 251, n (n=6, in the example shown in FIG. 11,) pixels in the horizontal direction and m (m=6, in the example shown in FIG. 11) pixels in the vertical direction are acquired by sampling. In this case, an (n×m)-dimensional vector constituted by the pixel values of the pixels is acquired. For example, when the pixel values of the pixels represented by the arrows P0 to P2 are represented as pixel values P0 to P2, the pixel values P0 to P2 constitute a vector as a feature quantity.

Figure 12:
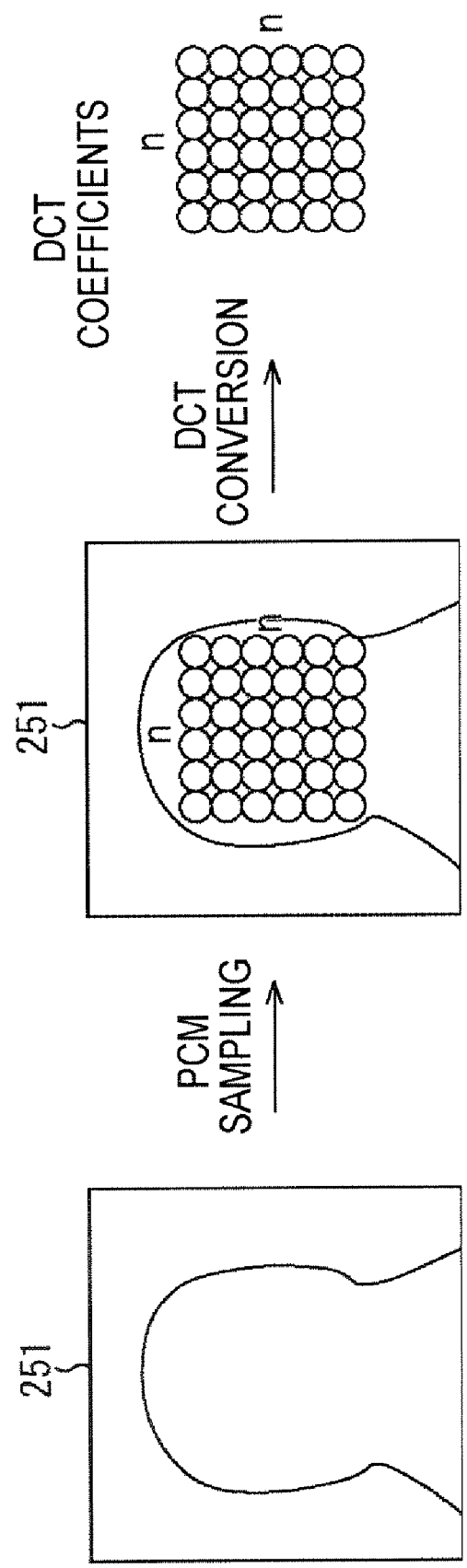
FIG. 12 is an illustration for explaining an example of a feature quantity extracted from face image data.

In addition, for example, as shown in FIG. 12, the pixel values (face image data) of k (=n×n) pixels acquired by sampling the face image data of the face image 251 supplied from the capturing section 81 in accordance with the PCM method may further be subjected to discrete cosine transformation (DCT) conversion, and a k-dimensional vector constituted by acquired k DCT coefficients may be defined as a feature quantity.

In FIG. 12, a circle on the face image 251 at the center of FIG. 12 represents a pixel. For example, as pixels of a facial portion of the person to be identified on the face image 251, n (n=6, in the example shown in FIG. 12) pixels in the horizontal direction and n (n=6, in the example shown in FIG. 12) pixels in the vertical direction are acquired by sampling. In this case, (n×n) pixel values are acquired. In addition, by DCT-converting the pixel values of the pixels, DCT coefficients corresponding to the individual pixels are acquired. Thus, an (n×n)-dimensional vector constituted by the DCT coefficients is acquired.

Figure 13:
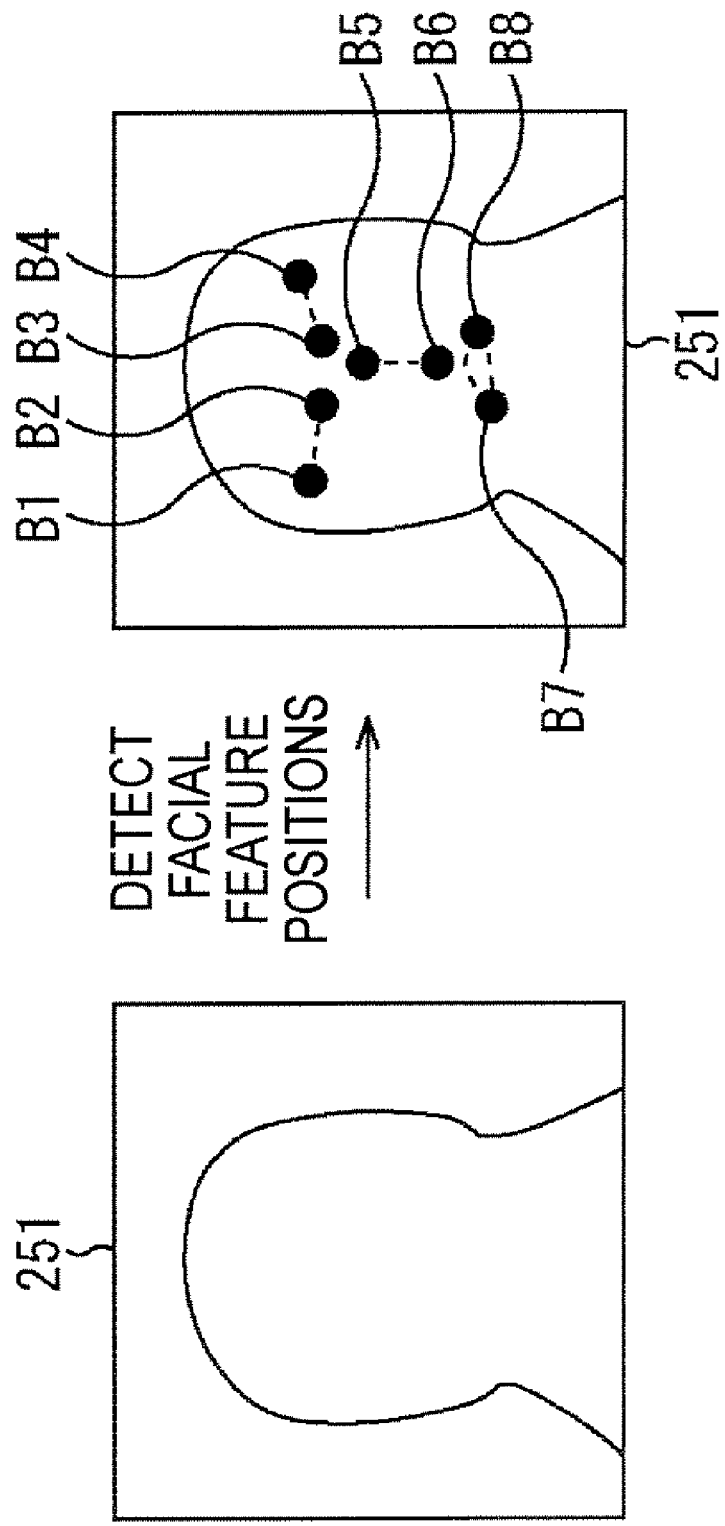
FIG. 13 is an illustration for explaining an example of a feature quantity extracted from face image data.

As shown in FIG. 13, feature points of the face of the face image 251 may be detected, and a vector constituted by the values at the coordinates of the detected feature points may be defined as a feature quantity.

In FIG. 13, points B1 to B8 on the face image 251 represent detected feature points of the face of a person to be identified. For example, the points B1 and B2 represent the right edge and the left edge of the right eye of the person, and the points B3 and B4 represent the right edge and the left edge of the left eye of the person. In addition, the points B5 and B6 represent the upper edge (the base) and the lower edge (the tip) of the nose of the person, and the points B7 and B8 represent the right edge and the left edge of the mouth of the person.

When the coordinates of a point Bn ($1 \leq n \leq 8$) based on a predetermined point on the face image 251 is represented by (Xn,Yn), a 2n-dimensional (16-dimensional in the example shown in FIG. 13) vector constituted by coordinates components Xn and Yn at points Bn can be acquired. Thus, in the example shown in FIG. 13, a vector (X1, Y1, X2, Y2, and X8, Y8) constituted by the coordinate components at the points B1 to B8 is defined as a feature quantity.

Referring back to the flowchart of FIG. 10, after the k-dimensional feature quantity is extracted from the captured face image data, the process proceeds to step S13.

In step S13, the extraction section 84 extracts k-dimensional feature quantities from past face image data recorded in the face image memory 83, and supplies the extracted feature quantities to the classification unit 211 of the estimation section 85. For example, the extraction section 84 acquires face image data from the face image memory 83, and performs processing similar to the processing performed by the extraction section 82 in step S12 in order to extract feature quantities from the acquired face image data.

In step S14, the estimation section 85 estimates a distribution range. Although a process for estimating a distribution range will be described later, in the process for estimating the distribution range, the estimation section 85 calculates a discriminant axis for separating distributions of feature quantities in accordance with classes, and supplies the acquired discriminant axis to the converter 217.

In the process for estimating the distribution range, the estimation section 85 calculates the position of the center of distribution (distribution center position) and the distribution width for each class, and calculates, in accordance with the calculated distribution center position and the calculated distribution width, an estimated center position, which is the center of distribution of the feature quantities of face images to be captured in the future (for example, the period T3) and an estimated width, which is the width of deviation of the distribution. Then, the estimation section 85 supplies the calculated estimated center position and the calculated estimated width to the determination unit 218 of the authentication section 86.

In step S15, the converter 217 converts, using the discriminant axis supplied from the determination/analysis unit 212 of the estimation section 85, the k-dimensional feature quantity of the captured face image supplied from the extraction section 82 into a one-dimensional feature quantity. Then, the converter 217 supplies to the determination unit 218 the one-dimensional feature quantity acquired by conversion.

For example, "x" represents the k-dimensional feature quantity (vector) of the captured face image and "y" represents the discriminant axis (vector). The converter 217 converts the k-dimensional feature quantity into a one-dimensional feature quantity by calculating the inner product x·y of the k-dimensional feature quantity x and the k-dimensional discriminant axis y.

In step S16, the determination unit 218 determines whether or not the one-dimensional feature quantity x·y supplied from the converter 217 is within an estimated distribution range, which is defined on the basis of the estimated center position supplied from the distribution center estimator 214 of the estimation section 85 and the estimated width supplied from the distribution range estimator 216 of the estimation section 85, in a feature space. Then, the determination unit 218 generates a signal indicating the result of determination, and supplies the generated signal to the output section 87.

For example, when "x·y" represents the one-dimensional feature quantity supplied from the converter 217, "m" represents the estimated center position, and "d3" represents the estimated width, the determination unit 218 determines whether or not the feature quantity x·y is within the estimated distribution range in accordance with determination of whether or not the one-dimensional feature quantity x·y satisfies the following condition:

$$m3 - d3 < x \cdot y \leq m3 + d3 \qquad (1).$$

For example, if the one-dimensional feature quantity x·y satisfies condition (1), the determination unit 218 determines that the one-dimensional feature quantity is within the estimated distribution range. In contrast, if the one-dimensional feature quantity x·y does not satisfy condition (1), the determination unit 218 determines that the one-dimensional feature quantity is not within the estimated distribution range.

If it is determined in step S16 that the feature quantity is within the estimated distribution range, the process proceeds to step S17. In step S17, the output section 87 generates a signal indicating that the person to be identified has been authenticated as the registered person in accordance with a signal indicating the result of determination supplied from the determination unit 218. Then, the output section 87 outputs to a computer or the like (not shown) the generated signal indicating that the person has been authenticated as the registered person. Then, the authentication process is terminated.

In contrast, if it is determined in step S16 that the feature quantity is not within the estimated distribution range, the process proceeds to step S18. In step S18, the output section 87 generates a signal indicating that the person to be identified has been identified as not being the registered person in accordance with a signal indicating the result of determination supplied from the determination unit 218. Then, the output section 87 outputs to the computer or the like (not shown) the generated signal indicating that the person has been identified as not being the registered person. Then, the authentication process is terminated.

As described above, the authentication apparatus 71 calculates the distribution center position and the distribution width of feature quantities for each class according to the period in which the face image was captured. Then, the authentication apparatus 71 calculates an estimated distribution range on the basis of the distribution center position and the distribution width for each class, and determines whether or not the person to be identified is equal to the registered person in accordance with determination of whether or not the feature quantity extracted from the captured face image data is within the estimated distribution range.

As described above, since an estimated distribution range that changes with the lapse of time is calculated on the basis of the distribution center position and the distribution width calculated for each class, a more accurate range in which the feature quantities of face images captured in a predetermined period will be distributed in a feature space can be estimated more easily. Thus, by performing personal authentication of a person to be identified in accordance with determination of whether or not the feature quantity extracted from face image data of a newly captured face image is within the estimated distribution range, more reliable face image authentication can be performed more easily. Thus, spoofing using a previously captured photograph of the face of the registered person can be prevented. In addition, even in a case where the face of the registered person changes with the lapse of time, the person to be identified is not incorrectly identified as not being the registered person.

The process for estimating a distribution range corresponding to the processing of step S14 in FIG. 10 will now be described with reference to the flowchart of FIG. 14.

In step S51, the classification unit 211 classifies k-dimensional feature quantities supplied from the extraction section 84 into classes according to periods in which face images were captured. The classification unit 211 generates class information indicating the result of classification, and supplies to the determination/analysis unit 212 and the converter 213 the generated class information and the feature quantities.

For example, when face image data of face images captured in the periods T1 and T2 shown in FIG. 3 is recorded in the face image memory 83, the classification unit 211 classifies, from among the feature quantities supplied from the extraction section 84, the feature quantities of face images captured in the period T1 as feature quantities belonging to a class T1 and the feature quantities of face images captured in the period T2 as feature quantities belonging to a class T2.

In step S52, the determination/analysis unit 212 calculates a discriminant axis on the basis of the class information and the feature quantities supplied from the classification unit 211, and supplies the acquired discriminant axis to the converter 213 and the converter 217.

For example, when feature quantities x are classified into the class T1 or T2, the determination/analysis unit 212 calculates a variable matrix SC1 indicating variation of the class T1 on the basis of the feature quantities x belonging to the class T1 or calculates, similarly, a variable matrix SC2 indicating variation of the class T2 on the basis of the feature quantities x belonging to the class T2. Then, the determination/analysis unit 212 calculates an intra-class variable matrix SW and an inter-class variable matrix SB on the basis of the calculated variable matrices SC1 and SC2.

In addition, the determination/analysis unit 212 calculates an eigenvector corresponding to the maximum eigenvalue of the product $SW^{-1}SB$ of an inverse matrix $SW^{-1}$ of the intra-class variable matrix SW and the inter-class variable matrix SB, and defines the calculated eigenvector as a discriminant axis.

In step S53, the converter 213 converts, using the k-dimensional discriminant axis supplied from the determination/analysis unit 212, the k-dimensional feature quantities of the past face images supplied from the classification unit 211 into one-dimensional feature quantities. The converter 213 supplies to the distribution center estimator 214 and the distribution deviation calculator 215 the one-dimensional feature quantities acquired by conversion and the class information supplied from the classification unit 211.

For example, when "x" represents a k-dimensional feature quantity (vector) of a past face image and "y" represents a k-dimensional discriminant axis (vector), the converter 213 converts the k-dimensional feature quantity into a one-dimensional feature quantity by calculating the inner product x·y of the k-dimensional feature quantity x and the discriminant axis y.

In step S54, the distribution center estimator 214 calculates an estimated center position on the basis of the feature quantities and the class information supplied from the converter 213, and supplies the calculated estimated center position to the distribution range estimator 216 and the determination unit 218.

For example, when "xi" represents a set of feature quantities x belonging to a class Ti (i=1 or i=2), the distribution center estimator 214 acquires a position mi at the center of the distribution of the one-dimensional feature quantities x·y acquired by degeneration of the feature quantities x belonging to the class Ti (that is, the feature quantities x from which the feature quantity set xi is originated) by using the following equation:

$$mi = \frac{1}{ni} \sum_{x \in xi} x \cdot y, \qquad (2)$$

where "ni" represents the number of the feature quantities x belonging to the class Ti (that is, the number of the feature quantities x from which the feature quantity set xi is originated). In addition, "Σx·y" indicates that the one-dimensional feature quantity x·y of each of the feature quantities x belonging to the class Ti is calculated and that the total sum of the calculated one-dimensional feature quantities x·y is acquired. For example, the distribution center estimator 214 acquires the position m1 at the center of the distribution of the class T1 shown in FIG. 8 (hereinafter, also referred to as a distribution center position) and the distribution center position m2 of the class T2 by using equation 2.

In addition, since the periods T1 to T3 (see FIG. 3) have the same length, when "t" represents a predetermined reference point in time of the period Ti (for example, a point in time at the beginning of the period T1), a reference point in time of a period Ti ($1 \leq i \leq 3$) (for example, a point in time at the beginning of the period Ti) can be represented by "t".

In addition, since the distribution center position of the period T1 is represented by m1 and the distribution center position of the period T2 is represented by m2, the distribution center position changes by the amount corresponding to the difference m2−m1 during the time from the period T1 to the period T2. In addition, since the duration from a reference point in time of a predetermined period T(i−1) to a reference point in time of the period Ti has a constant length t, the distribution center position is estimated to change by the amount corresponding to the difference m2−m1 during the time from the period T(i−1) to the period Ti. Thus, the distribution center position mi in the period Ti can be represented by the following equation:

$$mi=((m2-m1)/t)(Ti)+2(m1)-m2 \quad (3).$$

By substituting the period T3=3t into the variable Ti of equation (3), the value 2m1−m1 (=(m2−m1)/t)(3t)+2(m1)−m2), which is the estimated center position (distribution center position) m3 of the period T3, can be acquired. After acquiring the estimated center position m3 by using equation (3), the distribution center estimator 214 supplies the acquired estimated center position m3 to the distribution range estimator 216 and the determination unit 218. Then, the process proceeds to step S55.

In step S55, the distribution deviation calculator 215 calculates the distribution width of distribution of feature quantities belonging to each class in accordance with the feature quantities and the class information supplied from the converter 213, and supplies the calculated distribution width to the distribution range estimator 216.

For example, in a case where feature quantities x are classified into the class T1 or T2, when "xi" represents a set of feature quantities x belonging to the class Ti (i=1 or i=2), the distribution deviation calculator 215 calculates a distribution center position mi of one-dimensional feature quantities x·y acquired by degeneration of the feature quantities x belonging the class T1 (that is, the feature quantities x from which the feature quantity set xi is originated) by using equation (2).

The distribution deviation calculator 215 defines the largest value from among the absolute values of the differences between the feature quantities x·y belonging to each class Ti (degeneration of the feature quantities x) and the distribution center position mi of the class Ti as the distribution width di of the class Ti. That is, the distribution deviation calculator 215 calculates the distribution width di of the class Ti by using the following equation:

$$di=\max(|x \cdot y-mi|:x \in xi) \quad (4),$$

where "max(Q)" represents the largest value of the variable Q in the parenthesis. Thus, equation (4) indicates that the largest value of |x·y−mi| is defined as the distribution width di in accordance with the idea in which the feature quantity set xi is originated from feature quantities x.

Thus, for example, the distribution width di of the class T1 and the distribution width d2 of the class T2 are acquired, as shown in FIG. 8.

In step S56, the distribution range estimator 216 calculates an estimated width on the basis of the distribution width di supplied from the distribution deviation calculator 215. Then, the distribution range estimator 216 supplies the acquired estimated width to the determination unit 218 of the authentication section 86. Then, the process proceeds to step S15 in FIG. 10.

For example, when the distribution width d1 of the class T1 and the distribution width d2 of the class T2 are supplied from the distribution deviation calculator 215, the distribution range estimator 216 defines a larger distribution width (the largest distribution width) out of the supplied distribution widths d1 and d2 as an estimated width d3, which is the width of deviation of the distribution of the feature quantities in the future period T3. That is, the distribution range estimator 216 acquires the estimated width d3 by using the following equation:

$$d3=\max(d1,d2) \quad (5),$$

where "max(d1,d2)" indicates that a larger one of the distribution widths d1 and d2 is defined as the estimated width d3. The distribution range estimator 216 acquires the estimated width d3, for example, as shown in FIG. 8, by using equation (5). Thus, in the example shown in FIG. 8, the one-dimensional feature quantity x·y of a face image to be captured in the future period T3 is estimated to be within an area (estimated distribution range) having the width d3 with respect to the estimated center position m3.

As described above, the estimation section 85 converts k-dimensional feature quantities of past face images into one-dimensional feature quantities, and calculates an estimated center position and an estimated width on the basis of the one-dimensional feature quantities acquired by conversion.

Accordingly, by converting k-dimensional feature quantities into one-dimensional feature quantities, an estimated center position and an estimated width can be easily calculated in accordance with the one-dimensional feature quantities acquired by conversion.

As an example of calculation of an estimated width, an example in which the distribution range estimator 216 defines, using equation (5), the largest distribution width from among distribution widths of individual classes Ti as an estimated width has been explained. However, an estimated width may be calculated on the basis of the standard deviation of the feature quantities x·y of the individual classes Ti.

For example, when feature quantities x are classified into the class T1 or T2, the distribution range estimator 216 acquires the estimated width d3 by using the following equation:

$$d3=(e)_{1/2} \quad (6),$$

where "e" of equation (6) is represented by the following equation:

$$e = \frac{1}{n1+n2} \sum_{i=1,2} \sum_{x \in xi} (x \cdot y - mi)^2, \quad (7)$$

where the right $\Sigma$ indicates that, concerning the feature quantities x belonging to the class Ti, the total sum of $(x \cdot y - mi)^2$ is calculated, and the left $\Sigma$ indicates that the total sum of $(x \cdot y - mi)^2$ is calculated while "i" of $\Sigma(x \cdot y - mi)^2$ is changed from 1 to 2, and where "n1" and "n2" represent the number of feature quantities x belonging to the class T1 and T2, respectively.

As described above, by acquiring an estimated width on the basis of the standard deviation of feature quantities, a more accurate (more strict) estimated width can be acquired compared with a case where the largest value of distribution widths is defined as an estimated width. Thus, there is less possibility that a person who is not the registered person is incorrectly authenticated as the registered person.

In addition, although calculation of an estimated center position by the distribution center estimator 214 and calculation of a distribution width by the distribution deviation calculator 215 have been explained, calculation may not be necessarily performed for each authentication process. In this case, the distribution center estimator 214 and the distribution deviation calculator 215 may store a calculated estimated center position and a calculated distribution width, and the stored estimated center position and distribution width may be used as necessary when an authentication process is performed.

In addition, every time a person is authenticated on the basis of a face image newly captured, face image data of the newly captured face image may be recorded in the face image memory 83. Then, every time an authentication process is performed, the face image data may be used as past face image data.

In addition, past periods in which past face images recorded in the face image memory 83 were captured are not limited to two consecutive periods. That is, periods in which face images used as past face images were captured may be a plurality of non-consecutive periods or a plurality of consecutive periods. In addition, such past periods may be two or more periods.

As described above, an estimated distribution range is calculated on the basis of distribution center positions and distribution widths of individual classes, and authentication of a person to be identified is performed in accordance with determination of whether or not the feature quantity extracted from face image data of a captured face image is within the estimated distribution range. Thus, more reliable face image authentication can be performed more easily.

Figure 15:
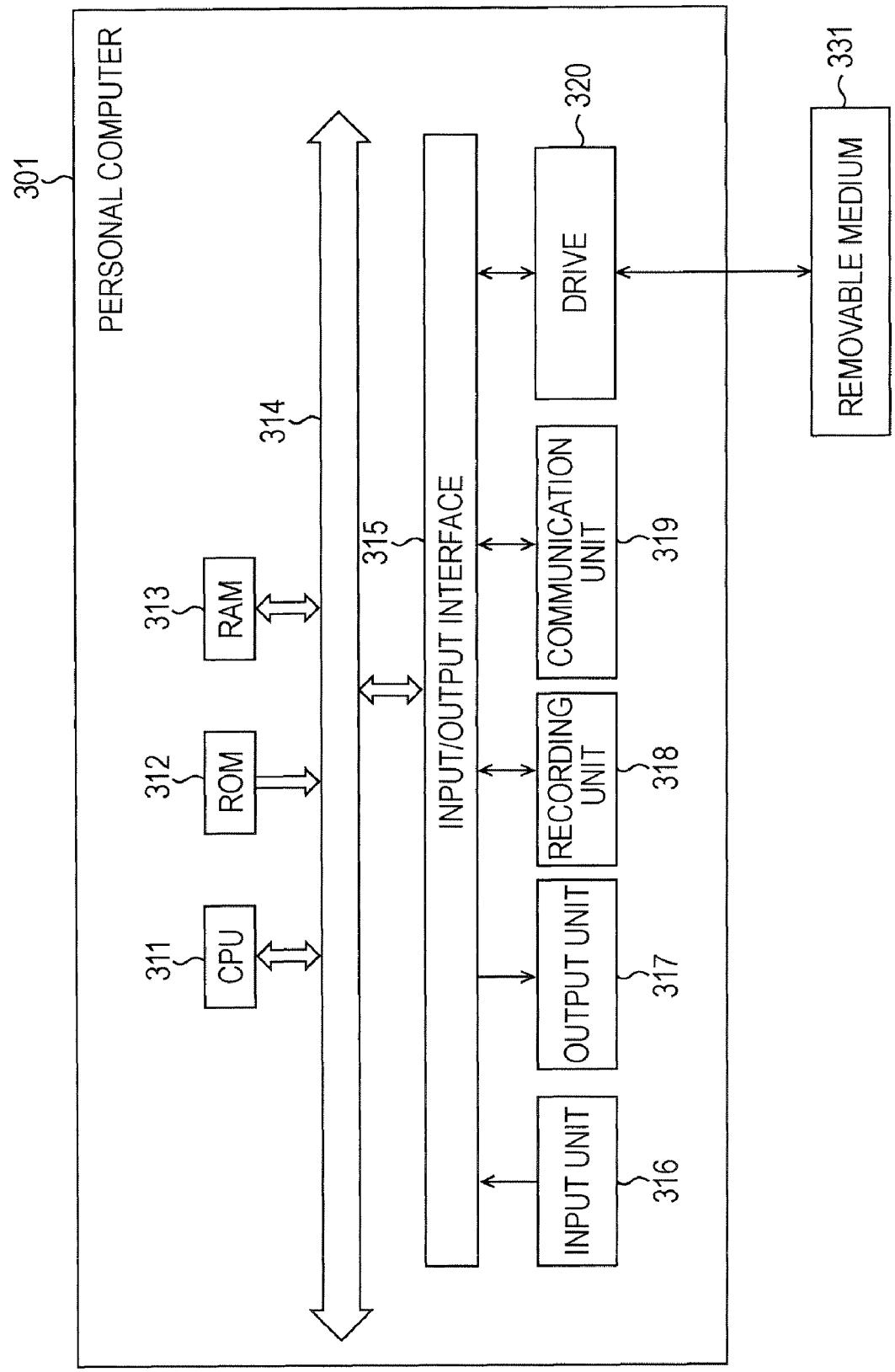
FIG. 15 is a block diagram showing an example of the configuration of a personal computer.

FIG. 15 is a block diagram showing an example of the configuration of a personal computer that executes the above-described series of processing in accordance with a program. A central processing unit (CPU) 311 of a personal computer 301 performs various type of processing in accordance with a program recorded in a read-only memory (ROM) 312 or a recording unit 318. A program or data to be executed by the CPU 311 is appropriately stored in a random-access memory (RAM) 313. The CPU 311, the ROM 312, and the RAM 313 are connected to each other via a bus 314.

An input/output interface 315 is connected to the CPU 311 via the bus 314. An input unit 316 including a keyboard, a mouse, a microphone, and the like and an output unit 317 including a display, a speaker, and the like are connected to the input/output interface 315. The CPU 311 performs various types of processing in response to an instruction received from the input unit 316. The CPU 311 outputs a processing result to the output unit 317.

The recording unit 318 connected to the input/output interface 315 includes, for example, a hard disk. The recording unit 318 records a program and various data executed by the CPU 311. A communication unit 319 communicates with an external apparatus via a network, such as the Internet or a local area network.

A program may be acquired via the communication unit 319, and the acquired program may be recorded in the recording unit 318.

When a removable medium 331, such as a magnetic disc, an optical disc, a magneto-optical disc, or a semiconductor memory, is mounted on a drive 320 connected to the input/output interface 315, the drive 320 drives the removable medium 331 to acquire a program, data, and the like recorded in the removable medium 331. The acquired program and data are transferred to and recorded in the recording unit 318 when necessary.

The foregoing series of processing may be performed by hardware or software. If the foregoing series of processing is performed by software, a program constituting the software is installed from a program recording medium on a computer installed in dedicated hardware or, for example, a general-purpose personal computer capable of performing various functions by installing various programs.

The program recording medium that is installed on the computer and that stores the program executable by the computer includes, for example, as shown in FIG. 15, the removable medium 331, which is a package medium, such as a magnetic disc (e.g., a flexible disc), an optical disc (e.g., compact disc read-only memory (CD-ROM), or a digital versatile disc (DVD)), a magneto-optical disc, or a semiconductor memory, the ROM 312 in which a program is temporarily or permanently stored, or the hard disk forming the storage unit 318. A program is stored into the program recording medium using a wired or wireless communication medium, such as a local area network, the Internet, or digital satellite broadcasting, via the communication unit 319, which is an interface, such as a router or a modem, when necessary.

In this specification, steps defining a program stored in the program recording medium are not necessarily performed in chronological order in accordance with the written order. The steps may be performed in parallel or independently without being performed in chronological order.

In addition, embodiments of the present invention are not limited to the foregoing embodiments. Various changes can be made to the present invention without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   first extracting means for extracting first feature quantities from image data of an image of a subject captured in a first period;
   first estimating means for estimating a first average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period;
   second estimating means for estimating a first distribution width indicating the width of dispersion of the first feature quantities with respect to the first average value on the basis of the second feature quantities and the third feature quantities; and
   determining means for determining whether or not the first feature quantities are within a predetermined range based on the first average value and the first distribution width.

2. The image processing apparatus according to claim 1, wherein:
   the first estimating means estimates the first average value on the basis of a second average value of the second feature quantities and a third average value of the third feature quantities; and
   the second estimating means estimates the first distribution width on the basis of a second distribution width indicating the width of dispersion of the second feature quantities with respect to the second average value and a third distribution width indicating the width of dispersion of the third feature quantities with respect to the third average value.

3. The image processing apparatus according to claim 2, wherein the second estimating means defines a larger one of the second distribution width and the third distribution width as the first distribution width.

4. The image processing apparatus according to claim 2, wherein the second estimating means defines, as the first distribution width, a value calculated by using an equation:

$$d3 = \sqrt{\frac{1}{n1+n2} \sum_{i=1,2} \sum_{x \in xi} (x \cdot y - mi)^2},$$

where d3 represents the first distribution width, x·y represents each of the second feature quantities and the third feature quantities, m1 represents the second average value, m2 represents the third average value, n1 represents the number of the second feature quantities, and n2 represents the number of the third feature quantities.

5. The image processing apparatus according to claim 1, further comprising second extracting means for extracting the second feature quantities from the image data of the image of the registered subject captured in the second period and for extracting the third feature quantities from the image data of the image of the registered subject captured in the third period.

6. The image processing apparatus according to claim 5, further comprising:
calculating means for calculating a discriminant axis for separating distribution of the second feature quantities and distribution of the third feature quantities in a feature space,
wherein the first extracting means defines an inner product of a feature quantity extracted from the image data of the image captured in the first period and the discriminant axis as one of the first feature quantities, and
wherein the second extracting means defines an inner product of a feature quantity extracted from the image data of the image captured in the second period and the discriminant axis as one of the second feature quantities, and defines an inner product of a feature quantity extracted from the image data of the image captured in the third period and the discriminant axis as one of the third feature quantities.

7. An image processing method comprising the steps of:
extracting first feature quantities from image data of an image of a subject captured in a first period;
estimating an average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period;
estimating a distribution width indicating the width of dispersion of the first feature quantities with respect to the average value on the basis of the second feature quantities and the third feature quantities; and
determining whether or not the first feature quantities are within a predetermined range based on the average value and the distribution width.

8. A computer-readable medium storing a program for causing a computer to execute processing comprising the steps of:
extracting first feature quantities from image data of an image of a subject captured in a first period;
estimating an average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period;
estimating a distribution width indicating the width of dispersion of the first feature quantities with respect to the average value on the basis of the second feature quantities and the third feature quantities; and
determining whether or not the first feature quantities are within a predetermined range based on the average value and the distribution width.

9. An image processing apparatus comprising:
a first extraction section that extracts first feature quantities from image data of an image of a subject captured in a first period;
a first estimation section that estimates a first average value of the first feature quantities on the basis of second feature quantities extracted from image data of an image of a registered subject captured in a second period, which is before the first period, and third feature quantities extracted from image data of an image of the registered subject captured in a third period, which is before the first period and which is different from the second period;
a second estimation section that estimates a first distribution width indicating the width of dispersion of the first feature quantities with respect to the first average value on the basis of the second feature quantities and the third feature quantities; and
a determination section that determines whether or not the first feature quantities are within a predetermined range based on the first average value and the first distribution width.

* * * * *